(12) United States Patent
Schiff et al.

(10) Patent No.: US 8,954,486 B2
(45) Date of Patent: Feb. 10, 2015

(54) SECURED IDENTITIES COLLABORATION SYSTEM AND METHOD

(75) Inventors: Eyal Schiff, Tel Aviv (IL); Yair Goldfinger, Ramat Hasharon (IL)

(73) Assignee: Dotomi, LLC, Westlake Village, CA (US)

( * ) Notice: Subject to any disclaimer, the term of this patent is extended or adjusted under 35 U.S.C. 154(b) by 988 days.

(21) Appl. No.: 11/575,597

(22) PCT Filed: Sep. 22, 2005

(86) PCT No.: PCT/IL2005/001015
§ 371 (c)(1),
(2), (4) Date: May 7, 2007

(87) PCT Pub. No.: WO2006/033108
PCT Pub. Date: Mar. 30, 2006

(65) Prior Publication Data
US 2007/0217557 A1 Sep. 20, 2007

(30) Foreign Application Priority Data
Sep. 23, 2004 (IL) .......................................... 164265

(51) Int. Cl.
*G06F 15/16* (2006.01)
*H04L 29/08* (2006.01)
*G06F 21/41* (2013.01)
*H04L 29/06* (2006.01)

(52) U.S. Cl.
CPC ............ *H04L 63/0815* (2013.01); *H04L 67/02* (2013.01); *G06F 21/41* (2013.01)
USPC .......................................... 709/200; 709/203

(58) Field of Classification Search
USPC .................... 709/200, 203; 715/245
See application file for complete search history.

(56) References Cited

U.S. PATENT DOCUMENTS

| | | | |
|---|---|---|---|
| 3,158,777 A | 11/1964 | Stecker et al. | |
| 6,460,079 B1 * | 10/2002 | Blumenau | 709/223 |
| 2002/0138649 A1 * | 9/2002 | Cartmell et al. | 709/245 |
| 2002/0174230 A1 * | 11/2002 | Gudorf et al. | 709/227 |
| 2003/0037131 A1 * | 2/2003 | Verma | 709/223 |
| 2003/0067483 A1 * | 4/2003 | Harris | 345/745 |
| 2005/0204041 A1 * | 9/2005 | Blinn et al. | 709/225 |
| 2005/0239448 A1 * | 10/2005 | Bayne | 455/414.3 |

OTHER PUBLICATIONS

Pope, M, Basic of Cookies in ASP.NET, Visual Basic User Ed., Microsoft Corp., Jan. 2003, pp. 1-12.

* cited by examiner

*Primary Examiner* — Esther Benoit
(74) *Attorney, Agent, or Firm* — Niro, Haller & Niro

(57) ABSTRACT

An identities collaboration system that comprises a Personal Service Provider (PSP) system for supplying specific user related personal service(s); means for assigning two different data files to each user opting-in to the PSP system, wherein one data file contains data representing the user identity at the PSP system and it assigned on a first domain, and the other data file(s) contains data representing the information regarding whether the user is opted-in, or another identity number that is related to the user identity at the PSP, and is assigned on a second domain. The data files are stored within the terminal of each of the opting-in users. The system also comprises a third party server for providing personal service or tailored content to the opting-in user; and a utilities package, located within each of the third party servers, for identifying or re-tagging the user as a PSP user by using the data files, whenever such data file exists, or existed in the past, and is currently missing from the terminal of the user.

10 Claims, 5 Drawing Sheets

SECURED IDENTITIES COLLABORATION SYSTEM AND METHOD

FIELD OF THE INVENTION

The present invention relates to data networks, such as LAN, WAN (e.g., Internet, Cable Network, etc). More particularly, the invention relates to the provision of a secured identities collaboration system between two or more network entities. Such entities can be Personal Service Providers (PSP), publisher(s), e-commerce web sites, search engines sites, or other entity that supplies specific user related personal service, or entity that re-tag the user on behalf of the PSP.

Preferred embodiments of the invention could be serving the PSP user personally tailored web advertisements, special set of iTV programs, WAN music station tracks based on the user preference, E-commerce website that provide the user with personally tailored discounts, or e-commerce site that tracks other entity user activities under its domain etc.

BACKGROUND OF THE INVENTION

U.S. Pat. No. 3,158,777 discloses a user-driven communication method and system, which enables direct communication of a services and goods provider with an Internet user. The disclosed system enables a surfer and/or interactive TV (iTV) user to influence, fully partially, the advertising space content to which he is exposed while surfing the Internet and/or using iTV. However, the content of the advertising space can be advertisement messages from specific providers, which are selected by the subscribed user or it can be personal messages that can only be exchanged between subscribers.

In order to allow a publisher or a third party entity to display a personal content message to a surfer browsing its web page, or to display personal iTV programs adapted to that surfer, the publisher first needs to identify the current user, and to know to which PSPs he is subscribed, if any. In methods described in prior art, the publisher needs to communicate with additional servers or entities (e.g., servers of a PSP), which the surfer might be registered to, in order to check whether the current user is a registered user. If found registered, the additional server may provide the publisher with the required identity or preferences of the registered user, or it can directly supply the personal service to the user. However, such a procedure is relatively complicated, and if the user is not a registered user in the additional server, then the publisher will receive no identifying information, and as a result, the communication established by such publisher is unnecessary, and reduces efficiency.

It is therefore an object of this invention to provide a secured identities collaboration system between network entities, that overcomes the problems of the prior art, and which allows to establish easy and effective communication, for example, between a service or goods provider and a surfer.

In addition, an object of this invention is to allow the publisher to obtain a preliminary identification of the users' subscription to certain PSPs in order to re-tag them in the future, in any case of PSP identity loss.

It is another object of this invention to provide an independent identities' system that resides on the publisher's server system, to eliminate any need for the publisher to connect to the personal service server to check the user's identity before deciding to redirect the user terminal to request the personal service server to serve him with personal content, or before tracking and logging the user activities in the publisher site and relating them to a certain PSP.

It is yet another object of the present invention to secure the user's identity at the PSP and to avoid access of unauthorized servers outside the PSP to his identity.

Other purposes and advantages of this invention will appear as the description proceeds.

SUMMARY OF THE INVENTION

The present invention is related to an identities collaboration system, which comprises: a) at least one Personal Service Provider (PSP) system for supplying specific user related personal service(s); b) means for assigning at least two different data files to each user opting-in to said PSP system, wherein one data file contains data representing the user identity at said PSP system and it assigned on a first domain (shall be referred as IPSP data file) and the other data file(s) contains data representing the information regarding whether said user is opted-in and is assigned on a second domain, or another identity number that is related to the user identity at the PSP (shall be referred as UPSP data file). Such identity number can be an encoded version of the user identity number for security reasons, or even the identity number itself—tough it is less secures. Said data files are stored within the terminal of each of said opting-in users; c) one or more third party servers for providing personal service or tailored content to said opting-in user; d) an utilities package located within each of said third party servers for identifying or re-tagging said user as PSP user by using said data files, whenever such data file exists on the terminal of said user.

According to an embodiment of the present invention, the utilities package comprises: a) management means for reading the first data file; and b) tagging means for reading the content of the other data file(s) and accordingly invoking application(s) for tagging the user as a PSP user.

Preferably, the terminal of the user can be any device with Internet connectivity or with any other digital media connectivity, e.g., a Personal Computer (PC), a hand-held device, a cellular telephone or a TV set or equipment connected thereto.

According to an embodiment of the present invention, the data file is a cookie.

The present invention further relates to an identities collaboration method, which comprises: a) providing at least one PSP system for supplying specific user related personal service(s); b) assigning at least two different data files to each user opting-in to said PSP system, wherein one data file contains data representing the user identity at said PSP system and it assigned on a first domain and the other data file(s) contains data representing the information regarding whether said user is opted-in and is assigned on a second domain, or another identity number that is tied to the user identity at the PSP. Said data files are stored within the terminal of each of said opting-in users; c) providing personal service or tailored content to said opting-in user via third party server(s); and d) providing an utilities package located within each of said third party servers for identifying or re-tagging said user as PSP user by using said data files, whenever such data file exists on the terminal of said user.

1. Re-tagging refers to the case in which the data files do not exist on the user terminal but the user is subscribed at the PSP
2: The servers who provide the content to the user are able to read the first data file (IPSP), and they don't need to read them both.

DEFINITIONS, ACRONYMS AND ABBREVIATIONS

Figure 1:
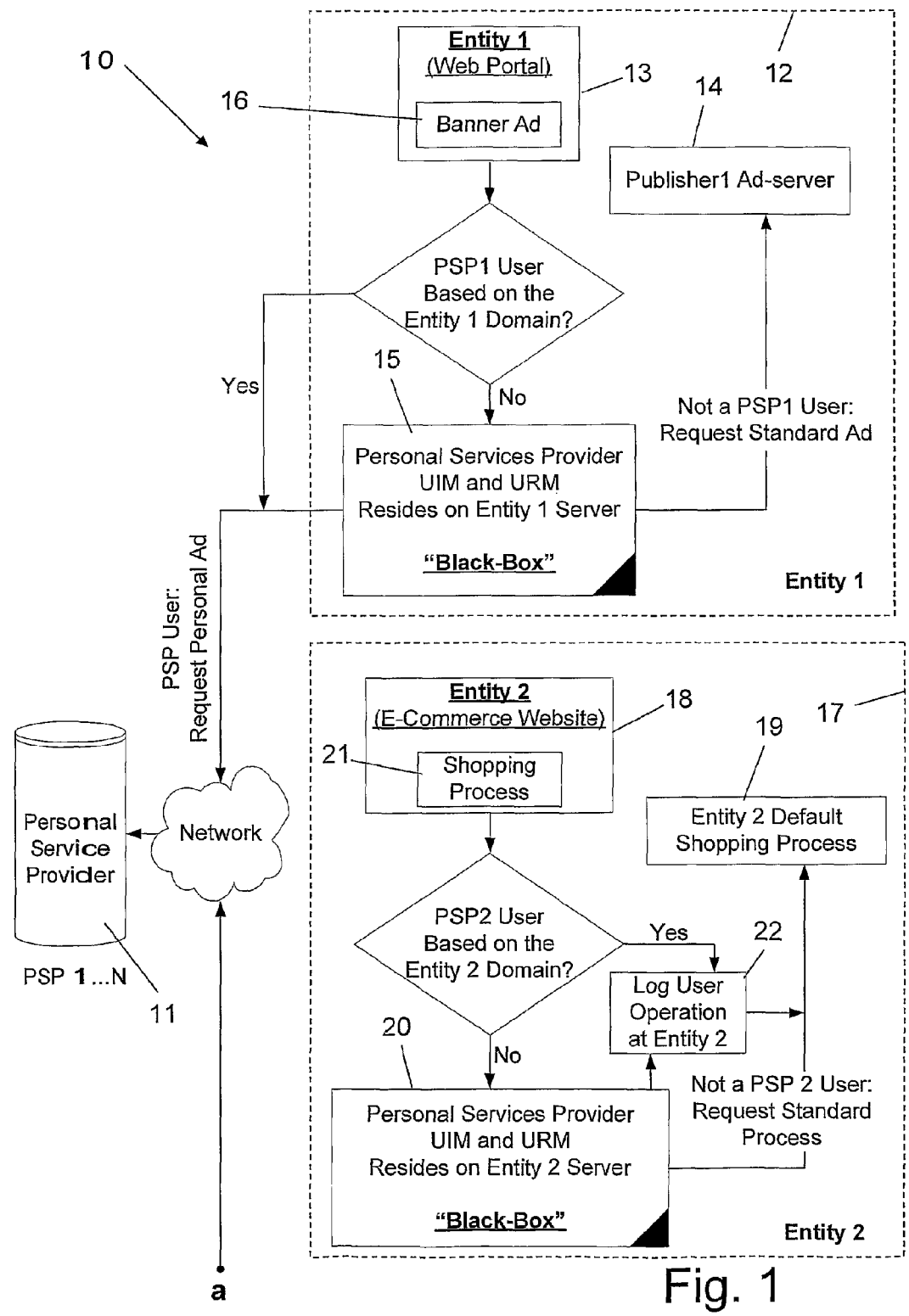
FIG. 1 is a general view of a PSP portal mechanism through which the method of the present invention is performed, shown in a simplified form.
Figure 1:
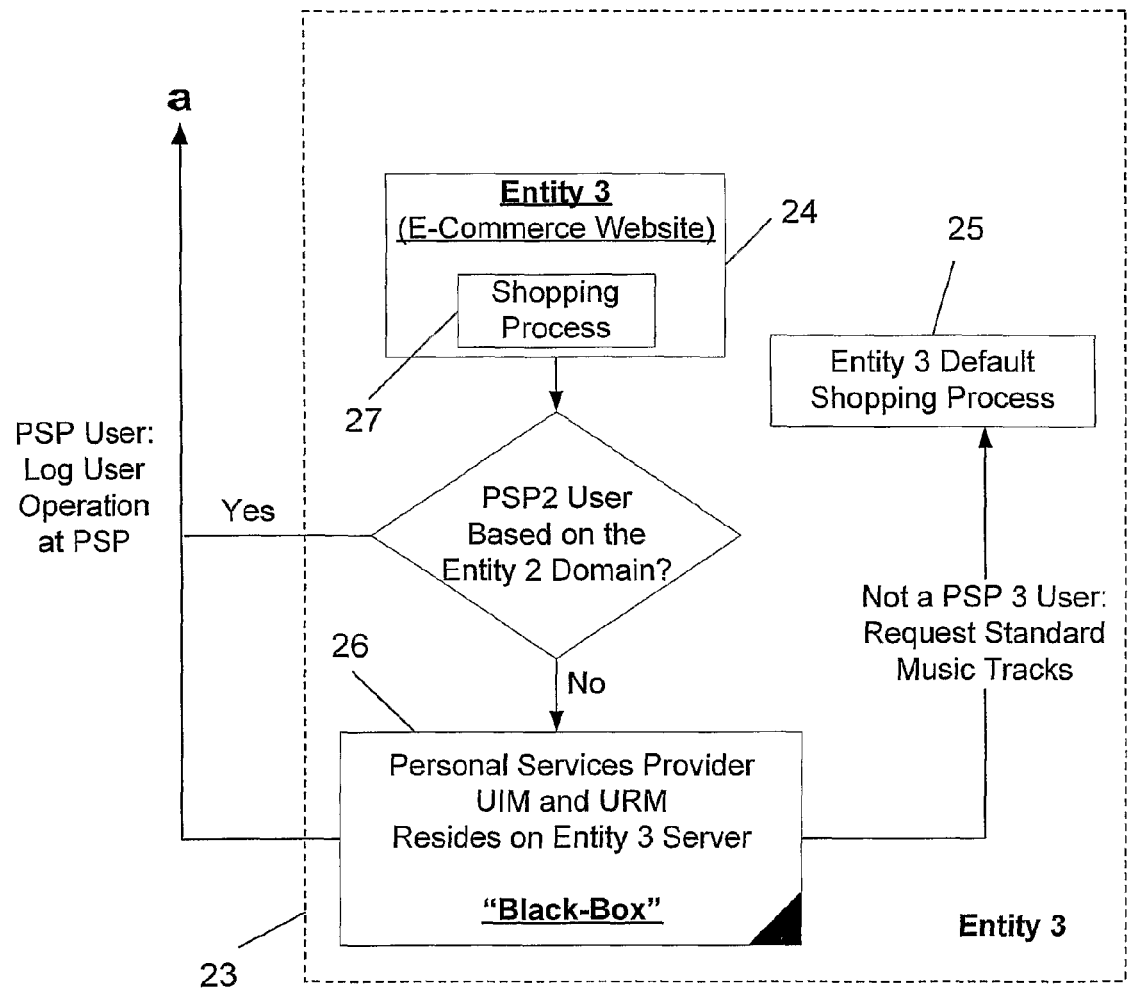

Throughout this specification, the following definitions are employed:

Interactive Television (iTV): Any television with what is called a "return path". Information flows not only from broadcaster to viewer, but also back from viewer to broadcaster. Another feature common to all iTV systems is the ability to offer each TV set, or each viewer who uses that TV set, a different choice of content.

Set-Top Box (STB): Any electronic device designed to produce output on a conventional television set (on top of which it nominally mounted) and connected to some other communication channels such as telephone, ISDN, optical fiber or cable. The STB usually runs software to allow the user to interact with the programs shown on the television in some way.

JavaScript: JavaScript is an object-oriented scripting language commonly used in websites. It was originally developed by Netscape Communications under the name "Mocha" and then "LiveScript" but then renamed to "JavaScript" and given syntax closer to that of Sun Microsystems' Java language. JavaScript was later standardized by ECMA under the name ECMAScript. The current standard (as of December 1999) is ECMA-262 Edition 3, and corresponds to JavaScript 1.5. Microsoft calls their version JScript.

Message sender: an entity to which the user is registered, such as service or content provider, publisher, company and the like;

Surfer: a user of a browser program, connected to the Web via any suitable peripheral, such as a computer, a cellular phone, a cable TV, etc., also referred to as "user", "consumer", "customer" or "client";

Terminal: any suitable connection apparatus, including, but not limited to, computers, cellular phones, cable TV, and the like;

Web browser: A software package like for example explorer 6.0 that enables a user to display and interact with HTML documents hosted by web servers. It is the most commonly used kind of user agent. The largest networked collection of hypertext documents is known as the World Wide Web.

AS (Administration Server): the server that operates the system of the personal messages, which contains data relative to all the users' portfolio, and additional programs and utilities. For example, the interfaces that enable the user to edit his portfolio, a database of the content provided by the publishers, the billing system, an interface for the portals ad server, etc. The AS may physically be one or a plurality of servers, which may be physically located at the same or at different net locations. Furthermore, parallel work of a plurality of ASs is also possible.

Company: any entity that can be included in a user's list and which can send advertising material to him, including but not limited to, commercial companies, non-profit organizations, governmental agencies, etc.

Provider: a supplier of services and/or of goods, including but not limited to commercial companies selling goods or services, governmental agencies, non-profit organizations, political organizations, and the like.

Advertisement: any type of information that a Provider wishes to bring to the attention of a surfer, including but not limited to, advertising material, product information, news, personal messages, interactive movies through the Web, advertising movies in interactive TV, etc.

AD server: a server that provides the advertisements.

Rich Media Campaign Server (RMCS): A server used by a provider to send messages to registered users.

Domain: an address within the internet computer network, which may be a single computer, a network of computers, or one of a number of accounts on a multi-user computer. The domain specifies the location (host computer) to which communications on the Internet are directed. Each domain has a corresponding 32-bit number usually represented by four numbers separated by periods, as 128.32.282.56. Each domain may also have an alphabetical name, usually composed of a name plus an extension separated by a period, as worldsoul.org; the alphabetical name is referred to as a domain name.

Cookies: cookie is a file that resides on the client machine. It contains data passed from web sites, so that web sites can communicate with this file when the same client returns. Usually, the web site only has access to the part of the cookie file that represents the interaction with that particular web site. Cookies enable server side connections, such as CGI scripts, to both store and retrieve information on the client side of the connection. The addition of a simple, persistent, client-side state significantly extends the capabilities of Web-based client/server applications. A server, when returning HTTP objects to a client, may also send a piece of state information, which the client will store. Included in that state object is a description of the range of URLs for which that state is valid. Any future HTTP requests made by the client, which fall in that range, will include a transmittal of the current value of the state object from the client, back to the server. Usually, this state object is the cookie.

In the present invention the use of the term cookie may refer to any other mean of client/user capability of identifying itself in front of the PSP or publisher.

Domain Name Service (DNS): a general-purpose distributed, replicated, data query service chiefly used on Internet for translating hostnames into Internet addresses. Also, the style of hostname used on the Internet, though such a name is properly called a fully qualified domain name. DNS can be configured to use a sequence of name servers, based on the domains in the name being looked for, until a match is found.

The name resolution client (e.g. Unix's gethostbyname ( ) library function) can be configured to search for host information in the following order: first in the local /etc/hosts file, second in NIS and third in DNS. This sequencing of Naming Services is sometimes called "name service switching". Under Solaris is configured in the file /etc/nsswitch.conf. DNS can be queried interactively using the command nslookup. It is defined in STD 13, RFC 1034, RFC 1035, and RFC 1591.

Banner Ad: A web banner or banner ad is a form of advertising on the World Wide Web. This form of online advertising entails embedding an advertisement into a web page. It is intended to attract a web surfer to a commercial website by linking them to the web site of the advertiser. The advertisement is constructed from an image (GIF, JPEG), JavaScript program or multimedia object employing technologies such as Java, Shockwave or Flash, often employing animation or sound to maximize presence. Images are usually in a high-aspect ratio shape. That is to say, either wide and short, or tall and narrow, hence the reference to banners. These images are usually placed on web pages that have interesting content, such as a newspaper article or an opinion piece.

The web banner is displayed when a web page that references the banner is loaded into a web browser. This event is known as an "impression". When the viewer clicks on the banner, the viewer is directed to the website advertised in the banner. This event is known as a "click through".

Web banners function the same way as traditional advertisements are intended to function: notifying consumers of the product or service and presenting reasons why the consumer would choose the product in question, although web banners differ in that the results for advertisement campaigns may be monitored real-time and may be targeted to the viewer's interests.

Another type of form included into the definition of a banner ad is an advertising link. The link can be any kind of promotion, or a shops name with short description, or any type of advertising can be found presented next to search engines results.

DETAILED DESCRIPTION OF PREFERRED EMBODIMENTS

According to a preferred embodiment of the present invention, any publisher requesting to serve its users with tailored content or with special services via a PSP (i.e., a third party entity) should use a Utilities Package (UP) referred as a "black box". The UP consists of two main mechanisms: User Identification Mechanism (UIM) and User Reviving Mechanism (URM), as will be described hereinafter.

The UP is an independent identities system, which resides on the server system of a publisher, eliminating any need of connecting to the servers of a PSP. The user identity, as was assigned by the PSP, can be checked by the UP before deciding whether to redirect the user terminal to request personal service server to serve him (i.e., the UP) with personal or tailored content/service.

According to an embodiment of the present invention, another major capability of the black-box package or the UP is to re-assign the user identity on behalf of the PSP, if such user has "lost" its public subscription to the PSP (e.g., when the file containing the user identity was deleted from the client terminal). The publisher can then request the PSP, using the URM, to re-tag the user.

According to an embodiment of the present invention, each surfer, when opting-in to a PSP, is tagged with at least two different data files (e.g., cookies), each of which is tagged on a different domain name. One tag is the user Identity at the Personal Service Provider (IPSP) on the PSP domain (e.g., http://IPSP.com); the other tag reflects the User of a Personal Service Provider on the UPSP domain (e.g., http://UPSP.com). The IPSP tag consists of the surfer's unique identifier, and the UPSP, consists only the information that the surfer is a PSP user (e.g., PSPUser=true), or any other information that is correlated to the user IPSP. Preferably, the data file is a type of cookie or other suitable tagging file.

Each publisher connected to the PSP system is allocated with a DNS entry address, e.g., address of the form http://publisher.UPSP.com.

The following is an explanation of how a web address of a publisher (e.g., http://publisher1.UPSP.com) can read all the tags with similar suffix or tail (e.g., http://UPSP.com), according to a preferred embodiment of the present invention:

When searching the cookie list stored in the user terminal for valid cookies, a comparison of the domain attributes of the cookie is made with the Internet domain name of the host from which the URL will be fetched. If there is a tail match, then the cookie will go through path matching to see if it should be sent. "Tail matching," means that domain attribute is matched against the tail of the fully qualified domain name of the host. For example, a domain attribute of "UPSP.com" would match host names "publisher1.UPSP.com" as well as "publisher2.UPSP.com". Adding this DNS entry allows servers residing at http://publisher.UPSP.com to read the cookies on UPSP.com, which as an outcome allows the publisher, by reading that cookie, to determine whether the user is a PSP user or not.

Looking now at FIG. 1, a general view of a secured identities collaboration system 10 through which the method of the present invention is performed, shown in a simplified form. System 10 comprises a PSP 11, and one or more servers of publisher(s) 12, 17 and 23. Each server of a publisher can be configured to provide any service or content suitable to be executed via a data network, such as advertising platform, shopping platform, music platform, and the like. For example, in this figure, system 10 includes three different platforms, in which the secured identities collaboration system is implemented. Preferably, but not limitatively, each entity's server 12, 17 and 23 consists of a default standard non-personalized data server (e.g., Ad-Server 14, Shopping process server 19 or Shopping process server 25), content means (e.g., web pages 13, e-shopping carts 18 or e-shopping carts 24) for displaying one or more personally tailored service and a Utility Package (e.g., black box 15, 20 or 26). Each of the content means 13, 18 and 24 is assigned space for displaying one or more personally tailored service, such as banner ad 16, shopping process 21 or shopping process 27. Preferably, the content of the services 16, 21 and 27 is a personal content adapted to each specific PSP user, whenever the UP 15, 20 or 26 (i.e., the user identification mechanism) identifies a user as a PSP user.

UP 15, 20 or 26 perform two main tasks: the first one is to identify whether a user is a PSP user, and the second one is to re-tag an existing PSP user which lost his identifying data files. UP 15, 20 or 26 comprise:

Management means for setting and reading the data files, which contains the user's subscription to the PSP (e.g., publisher PSP related cookies and UPSP related cookies), whenever such data files exists on the terminal of the user. For example, one way of implementing and deploying this invention is under a web-based platform that is client-server architecture. The management means then may comprise client side component(s), such as JavaScript or other similar languages. The idea behind this is that the user terminal, such as web browser 13, iTV Set-Top box and the like, sends its PSP subscription status (e.g., by a cookie or any other suitable means) to the management means. The management means refers hereinafter as UIM manager.

Means for reading the content of the other data file(s) assigned to a PSP user, which contain the information as to whether the user has subscribed to a PSP (e.g., UPSP cookie). Preferably, such means are a server/client component(s) that reads the UPSP cookie value and accordingly invokes applications that set the relevant cookies, and by that tags the PSP user, as such. The means for reading the content of the UPSP data file is referred hereinafter as UPSP reader.

When a user terminal navigates to the website of publisher 12 the publisher web page 13 verifies whether this user is tagged by a publisher cookie named hereinafter as "PSPUser". Upon obtaining a non-affirmative response, the publisher web page 13 invokes the UIM manager component of UP 15. UIM manager component of UP 15 invokes the UPSP reader component of UP 15, and checks if there is a cookie named "PSPUser" on the users' terminal in a predefined form such as "http://publisher.UPSP.com domain" which is a 3rd party context cookie. If the cookie is present, (if the cookie is present, the surfer is a PSP user) then its value is checked. Cookie value "true", or cookie with other value (a value related to the PSP identity), or any other sign as defined by the PSP, means that this user is considered as a PSP user. Otherwise, the user is not tagged as a PSP user.

The UIM manger component of UP 15 is notified whether the user is a PSP user. If yes, UIM manger component sets 1st party publisher cookie under a domain assigned to the publisher, such as http://publisher.com domain (or any equivalent publisher domain where the publisher page resides). This publisher cookie recognizes the user as a PSP user in front of the publisher's page.

An extension to that verification could be implemented when a given user is not considered a PSP user. A temporary cookie could be set for a period of several hours (e.g., 12 hours), marking that the user was checked at the UIM and should not be referenced until this cookie expires. The reason for doing this is to filter requests to some of the UIM components and increase performance.

When a user's terminal initiates a request for a said PSP based service at a given publisher content means (such as web page 13, E-Commerce website 18, etc.) and the user's terminal does not have any publisher based PSP cookie, the publisher container is using a UIM component to generate a new request from the user's terminal to the publisher's UPSP domain, in order to verify whether or not the current user is a PSP user.

This is common to all the UIM implementations that may arise. The user's terminal holds its subscription to a PSP, preferably, but not imitatively in a form of cookie.

The method proposed by the present invention may be deployed by several platforms. For example, going on with the web-based platform, which relies on client-server architecture, there are several possible implementations to the UIM.

They mainly differ on the essence of the UPSP reader. One approach uses the client's terminal to read the UPSP cookie. The other uses the server to read the UPSP cookie. Both approaches may be implemented in several ways according to the publisher needs and its technology. For example, one could use a server PHP script language component(s) in order to read the UPSP cookie and for supplying the UIM with the correct PSP subscription status of current user. Another may use a client side cookie reading, in order to notify the UIM about the user's status. Each approach may be tailored and used by the publisher's specific needs.

In several cases, the entity, which PSP users are facing, may not want to deliver these users any personally tailored content. Instead it may just log their operation for future use. These entities may keep these logs within their own servers without notifying the PSP, or alternatively log these operations at the PSP.

The entity 17, illustrated at FIG. 1, logs a user's purchase within its own resources when it founds out that this user is tagged as a PSP user.

Alternatively, entity 24 logs such user purchase outside its boundary at the user's PSP.

Figure 2:
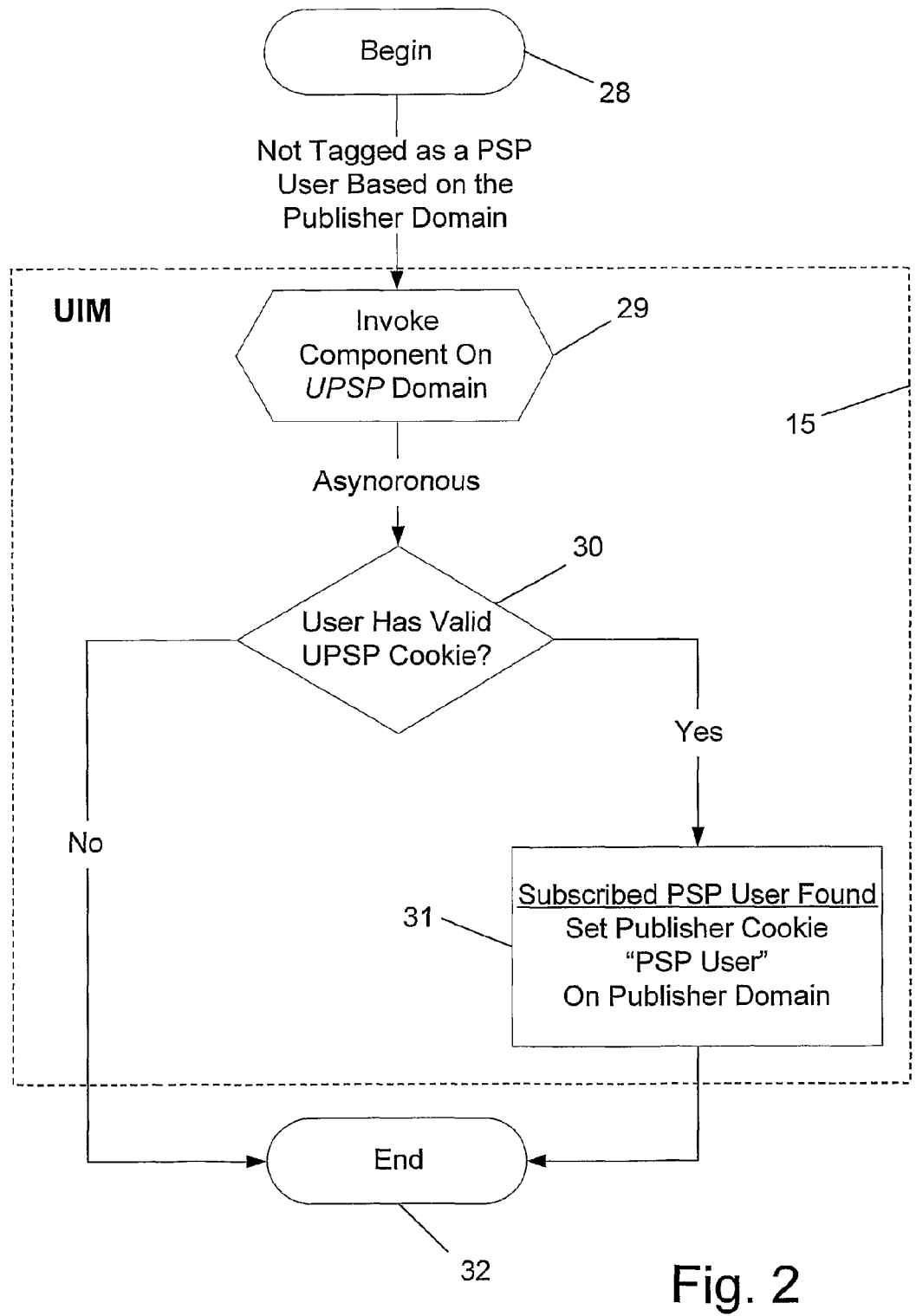
FIG. 2 is a flowchart showing the tagging of a PSP user by a publisher.

FIG. 2 is a flow chart showing the tagging of a user by the publisher 12, according to a preferred embodiment of the present invention. In the first step 28, the user is not identified yet as a PSP user, based on the publisher's cookie. At the next step, block 29, the UIM manager component of UP 15 invokes component on the http://publisher.UPSP.com domain. Then, in the next step 30, UIM 15 checks whether the user is a registered PSP user (i.e., whether the required cookie exists at the terminal of this user, and whether it contains information indicating that this user is a registered user at the PSP).

If no, then at the end of process, at step 32, the user is not a PSP registered user. However, if yes, then at the next step 31, UIM 15 sets publisher cookie "PSPUser" on the publisher domain (i.e., first party). The surfer is identified as a registered user, and the appropriate personal service can be displayed to him at the web page of the publisher.

Only if the user is a registered user, the publisher establishes communication with the PSP server, in order to obtain the details or information regarding the personal service to be displayed, or the publisher can redirect the user to the appropriate server.

Figure 3:
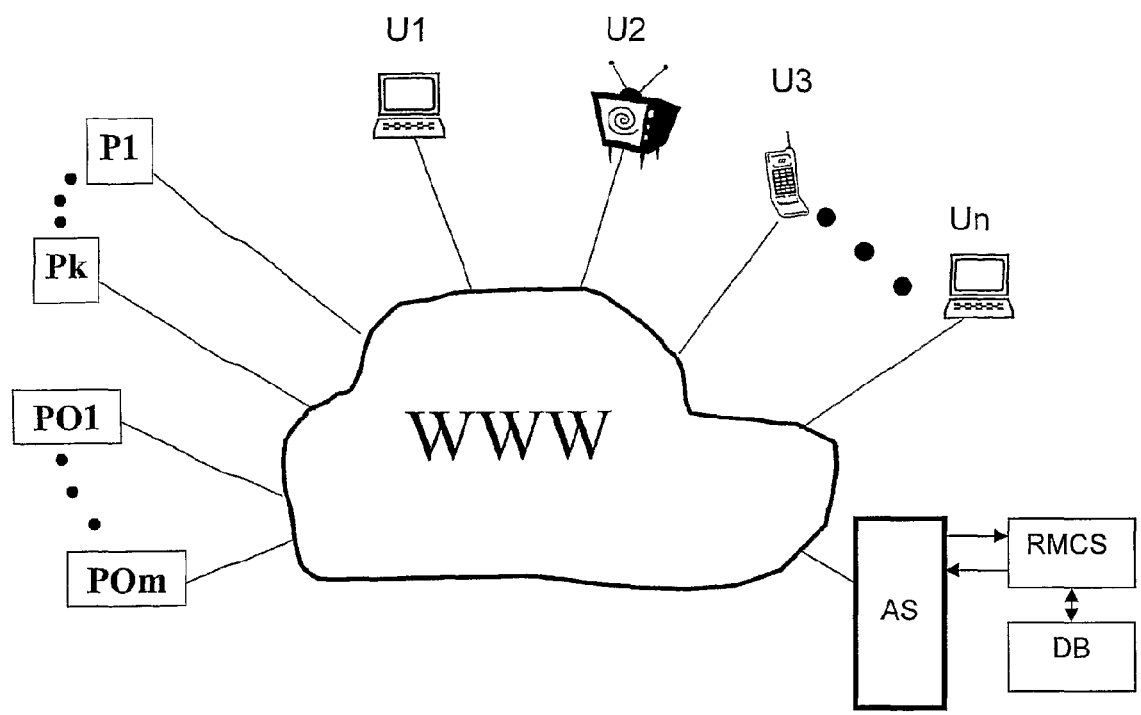
FIG. 3 is a general view of a PSP re-tagging mechanism.

The following are example for messaging over a data network using the system of the present invention. Messaging over a data network is described in more details in WO 02/10998. FIG. 3 schematically illustrates a general view of a system for messaging over a data network. The system comprises four basic entities: users, providers, portals and the AS. (All these entities are connected through the AS).

The plurality of users, U1-Un, has connectivity to the AS through any type of communication system. The users can be registered users that possess an account on the AS and/or non-registered users that do not posses an account on the AS. A user who registers with the AS receives a unique identifier The plurality of providers, P1-Pk, can send content to the AS by any type of communication system.

A plurality of portals, PO1-POm, provide the users with their own contents, as well as with content obtained from the AS, which includes the contents that were stored by the providers in the AS.

In the example of FIG. 3, the various entities are connected via any suitable type of data network, such as LAN or WAN. The providers can be of any type.

The users can use any suitable communication terminal, including computer terminals, e.g., a PC, a cellular phone, a palm computer, etc. As will be appreciated by the skilled person, the interface used by the user to communicate with the AS and the World Wide Web will vary according to the type of terminal employed. For instance, if a cellular phone is employed, connection can be established via WAP. The interface suitable for each type of terminal, however, is well understood by the skilled person, and is therefore not discussed herein in detail, for the sake of brevity.

Figure 4:
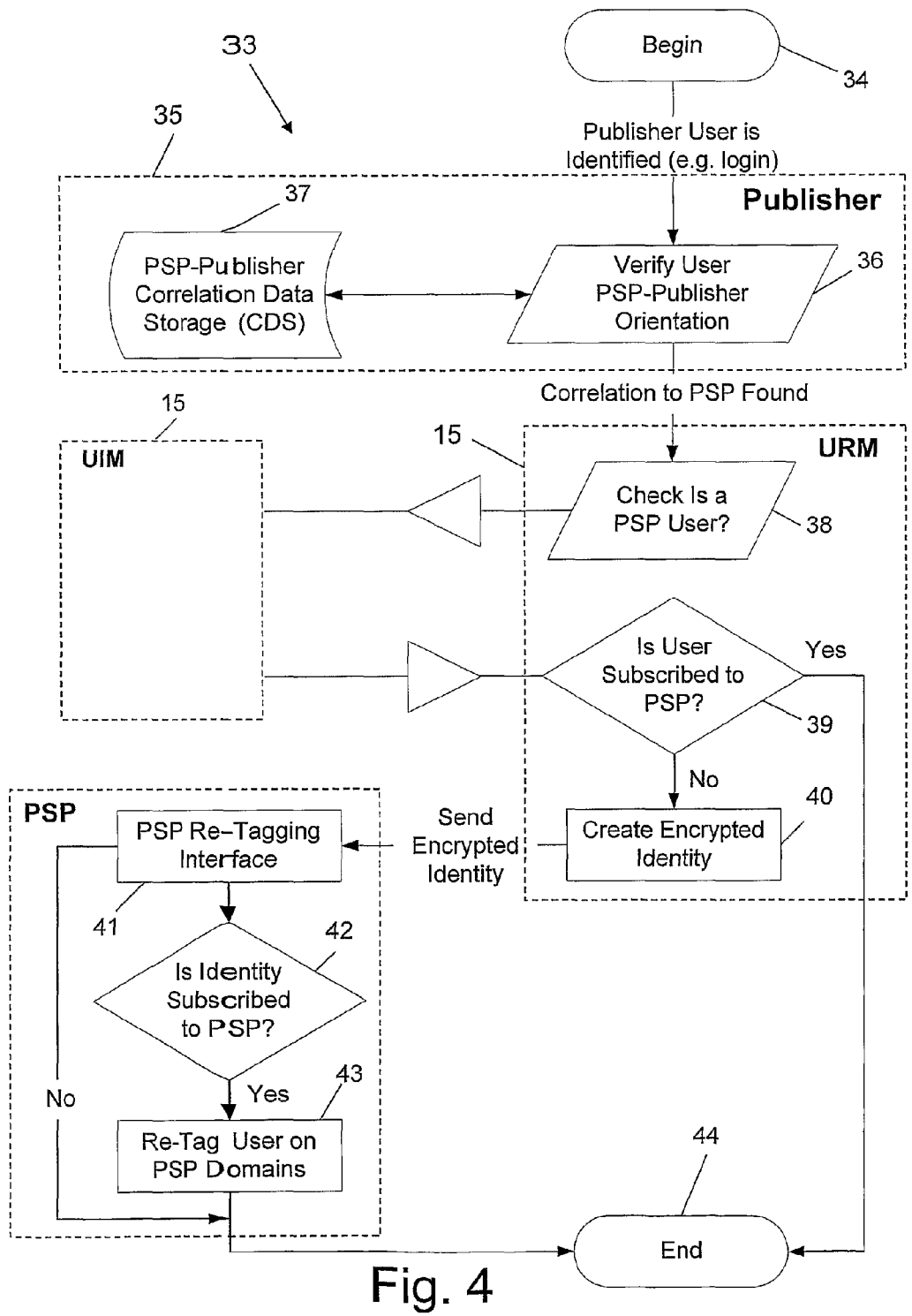
FIG. 4 is a schematic general view of a system for personal messaging over a data network.

FIG. 4 is a general flow chart showing the re-tagging of a PSP user who had lost its public UPSP cookies for any reason (not including opting-out of the PSP service), according to a preferred embodiment of the present invention.

Mechanism 33 comprises of a User Re-tagging Mechanism (URM) and an external PSP interface for receiving the user's re-tagging request. There are several predefined assumptions that must take place before this process can operate:

The publisher embedding the URM should hold any form of correlation between the user's PSP identity and same user's publisher's identity, which can be matched when user is identified at the publisher services server. The correlation could be created upon user's opting-in to the publisher service, by verifying user's PSP subscription status against the UIM. (Shall be referred as CDS—Correlation Data Storage).

Publisher has decided to re-tag the current user.

In the first step 34, the user is not identified yet as a publisher user. The user is about to be identified by the Publisher (e.g., by login). After being identified, the user enters a publisher component (step 35), which may decide upon certain circumstances to try and re-tag this user at PSP servers. The component is built of verification process (step 36), which takes the appropriate decision whether to try and re-tag said user. It tries to match the user identity at an internal CDS (step 37). Upon affirmative publisher's decision, at the next step 38, the URM 151 component of UP (i.e., "black box"), invokes component on the UIM 152 component of UP requesting to know whether the current user is a PSP user based on the UPSP cookie.

At the next step 39, it receives the response control back from the UIM 152 and acts as follows: if yes, the user is already tagged properly—i.e., there is no need for re-tagging. The process then jumps to step 44 and ends. If no, then at the next step 40, an encrypted user identity is created and sent to a PSP interface, at step 41.

This PSP re-tagging interface is a part of an external utility, which publishers could use. At the next step 42, the PSP verifies whether the identity is subscribed. If yes, the user is re-tagged on the IPSP and UPSP domains. If no, the user is not known as a PSP user—i.e., there is no need for re-tagging. The process then jumps to block 44 and ends.

The above embodiments of this innovation may be adjusted and implemented differently following its basic structure, in order to function in various set of environments, such as interactive TV, cellular phones, Internet websites, and any other mean of interactive channel between any two network entities.

Terminal entities could be any type user agent such as web browser, Set-Top box, etc. Such publishing entities could be web portal/e-commerce sites, interactive TV channel, cellular company server, etc.

While embodiments of the invention have been described by way of illustration, it will be understood that persons skilled in the field, with many modifications, variations and adaptations, can carry out the invention yet without departing from its spirit or exceeding the scope of the claims.

The invention claimed is:

1. An identities collaboration system, comprising:
a) at least one Personal Service Provider (PSP) application for supplying specific user related personal services(s) to a user;
b) at least two different data files to each user opting-in to said PSP application, wherein the first data file contains data representing the user identity at a first domain(s) of said PSP application, and is assigned on said first domain, and the second data file(s) contains data representing the information regarding whether said user is opted-in, and is assigned on a second domain, said at least two data files are stored within the terminal of each of said opting-in users;
c) a DNS hardware server capable of allocating, to a third party(ies), DNS entry addresses related to said second domain, for allowing said third party(ies), reading said second data file(s) from the terminal of said user;
d) one or more third party hardware servers for providing personal service or tailored content to said opting-in user whenever said user is connected to said third party(ies) only where such second data file contains information indicating that the user has opted in; and
e) at least one or more of the third party servers further containing a utilities package, located within each of said third party hardware servers, for identifying said user as a PSP user without the need to connect to said PSP application, or re-tagging said user as a PSP user, by using said at least two data files, whenever the at least two data files exist, or existed in the past and are missing from the terminal of said user; wherein said service provider downloads said at least two data file(s) to said terminal, for tagging said user and for identifying said user as a registered customer of said service provider by reading said at least two data file(s).

2. A system according to claim 1, in which the utilities package comprises:
memory, comprising:
a) management means for reading the first data file; and
b) tagging means for reading the content of the second data file(s) and accordingly invoking application(s) for tagging the user as a PSP user.

3. A system according to claim 1, in which the terminal of the user is a device with Internet connectivity or with other digital media connectivity.

4. A system according to claim 3, in which the terminal is selected from the group consisting of personal Computer, hand-held device, cellular telephone or a TV set or equipment connected thereto.

5. A system according to claim 1, in which each data file is a cookie.

6. An identities collaboration method, comprising:
a) providing at least one PSP application for supplying specific user related personal service(s) to a user;
b) assigning at least two different data files to each user opting-in to said PSP application, wherein the first data file contains data representing the user identity at a first domain(s) of said PSP application and is assigned on said first domain and the second data files(s) contains data representing the information regarding whether said user is opted-in and is assigned on a second domain, said at least two data files are stored within the terminal of each of said opting-in users;
c) creating a DNS entry address for a third party(ies) which is related to said second domain, for allowing said third party(ies) to read said second data file(s) from the terminal of said user;
d) providing a personal service or tailored content to said opting-in user via third party(ies) server(s); and
e) providing a utilities package located within each of said third party(ies) server(s) for identifying said user as a PSP user while eliminating any need of connection to said PSP application, or re-tagging said user as PSP user, by using said at least two data files, whenever such data file exists on the terminal of said user, wherein said service provider downloads said data file(s) to said terminal, for tagging said user and for identifying said user as a registered customer of said service provider by reading said at least two data file(s).

7. A method according to claim 6, wherein the utilities package comprises:
memory, comprising:
a) providing management means for reading the first data file; and
b) providing tagging means for reading the content of the second data file(s) and accordingly invoking applications(s) for tagging the user as a PSP user.

8. A method according to claim 6, wherein the terminal of the user is a device provided with Internet connectivity or with other suitable digital media connectivity.

9. A method according to claim 8, wherein the terminal is selected from the group consisting of Personal Computer, hand-held device, cellular telephone or a TV set or equipment connected thereto.

10. A method according to claim 6, wherein each data file is a cookie.

* * * * *